United States Patent [19]

Kegel et al.

[11] 4,340,183
[45] Jul. 20, 1982

[54] CORNER SYSTEM ADDITION FOR A CENTER PIVOT IRRIGATION SYSTEM

[75] Inventors: Richard L. Kegel, Bellevue; Burton J. Pugh, Ellensburg; Thomas R. Steury, Bellevue, all of Wash.

[73] Assignee: Sargent Mfg. Co., Inc., Othello, Wash.

[21] Appl. No.: 150,554

[22] Filed: May 16, 1980

[51] Int. Cl.³ .............................................. B05B 3/12
[52] U.S. Cl. .................................. 239/710; 239/719; 239/721; 239/DIG. 1
[58] Field of Search ........ 239/177, 710, 711, 718–721, 239/DIG. 1

[56] References Cited

U.S. PATENT DOCUMENTS

| | | | |
|---|---|---|---|
| 3,797,517 | 3/1974 | Kircher et al. | 239/710 |
| 3,802,627 | 4/1974 | Seckler et al. | 239/177 |
| 3,902,668 | 9/1975 | Daugherty et al. | 239/177 |
| 4,186,880 | 2/1980 | Jacobi et al. | 239/177 |

*Primary Examiner*—Robert B. Reeves
*Assistant Examiner*—Michael J. Forman

*Attorney, Agent, or Firm*—Cole, Jensen & Puntigam

[57] ABSTRACT

A corner boom which includes a secondary water conduit is pivotally connected to the end of a center pivot boom which includes a primary water conduit and comprises a series of sections which pivot relative to one another about a center pivot point. The corner boom is supported by a wheeled tower which moves along a predefined path. A first encoder is positioned on the end of the center pivot boom to determine the angular separation between the corner boom and the end section of the center pivot boom. Other encoders are positioned, respectively, on a wheel of the support towers of both the end section and the next adjacent section of the center pivot boom to determine the angle between a reference line and a straight line connecting the center pivot point and the end of the center pivot boom. From this information, the location of the end of the corner boom can be precisely determined, so that the electrical signals which control its movement can be generated and supplied to the corner boom at the proper time to result in the desired movement of the corner boom.

26 Claims, 5 Drawing Figures

CORNER SYSTEM ADDITION FOR A CENTER PIVOT IRRIGATION SYSTEM

BACKGROUND OF THE INVENTION

This invention relates generally to the art of irrigation systems, and more specifically concerns a corner watering system addition for a center pivot irrigation system.

Center pivot systems are being increasingly used to irrigate large sections of land. Typically, such systems are capable of watering a quarter section of land, i.e. 160 acres. A center pivot irrigation system generally comprises a long primary, or center, pivot boom, which includes a water conduit and a supporting truss arrangement. The center pivot boom is divided into a plurality of sections, each one of which pivot relative to its adjacent sections. The center pivot boom is supported by a plurality of wheeled towers, located at spaced intervals along the length of the center pivot boom, typically in the vicinity of the pivot points linking the sections, i.e. near the ends of the sections.

Sprinklers are located at spaced intervals along the length of the water conduit. The entire center pivot boom is moved about the center pivot point through movement of its wheeled towers, which are individually powered by motors, so that a circular pattern of water coverage is developed about the central pivot point.

The primary problem with such center pivot systems, however, is the lack of complete coverage of a given parcel of land, as the outline of the water coverage of such a system is a circle, while most land parcels are square or have a straight line outline. Hence, significant portions of a given section of land irrigated by a center pivot system are virtually lost to productive use. As an example, on a quarter section of land in which water from a center pivot system reaches to the edge of the section boundary at points intermediate of each of the section's sides, approximately 20 percent of the land in the section, in particular, the corner areas, is not irrigated.

In order to overcome this problem, corner systems have been developed which extend from the end of the center pivot boom to water the corners of the sections. In one simple system, a sprinkler gun is used at the end of the center pivot boom. The resulting improvement is not, however, satisfactory. In another system, the center pivot boom stops on the diagonal, and a corner boom then swings out to cover a portion of the corner. This significantly improves the coverage of the system but delays the overall watering cycle significantly, however, which is undesirable.

It is thus desirable that the center pivot boom move at its normal rate while the corner coverage system is functioning, but it is important to the proper operation of such a system that the position of the corner boom, particularly its end point, be known at all times, to maintain proper control of the corner boom relative to the movement of the center pivot boom. Presently, however, it is difficult to accurately ascertain the location of the corner boom, due to the skewed configuration of the center pivot boom while it is in operation.

One solution to this problem concerning the location of the corner boom, particularly its end point, is to have the boom follow a buried conductor, such as shown in U.S. Pat. No. 3,902,668 to Daugherty, et al. However, the apparatus disclosed in that patent is relatively expensive and the buried conductor is subject to accidental damage from conventional farm machinery, as well as rodents, etc. Also, if the corner boom for any reason strays from contact with the buried conductor, it is difficult and time-consuming to re-establish communication.

Accordingly, it is a general object of the present invention to provide a corner watering system which is useful with a center pivot watering system to overcome one or more of the disadvantages of the prior art noted above.

It is another object of the present invention to provide such a corner system which is capable of covering a significant portion of the corner areas of a square section of land not otherwise reached by a center pivot system.

It is an additional object of the present invention to provide such a corner system which is capable of being controlled to such an extent that it can follow an irregular pattern, such as in order to avoid fixed objects.

It is a further object of the present invention to provide such a corner system which is capable of precisely locating the end point of a movable corner boom.

It is yet another object of the present invention to provide such a corner system which takes into account the irregular configuration of the center pivot boom in locating the end of the corner boom.

SUMMARY OF THE INVENTION

Accordingly, the present invention is an apparatus which is useful as an addition to a conventional center pivot boom irrigation system which includes a primary water conduit and is divided into a plurality of sections which pivot relative to each other and which in operation revolves about a center pivot point. The apparatus includes a corner boom means, which in turn includes a secondary water conduit, joined to the end of the center pivot boom in a pivoting relationship thereto. Means are provided for supporting the corner boom means and for moving said supporting means and hence the corner boom means about the end of the center pivot boom in response to a signal command. The apparatus further includes means for determining the angle of the corner boom means relative to an imaginary reference line connecting the center pivot and the end of the center pivot boom. Means which uses the information from the angle determining means is provided to determine the position of said corner boom means, and then, there is a means for supplying signal commands to the moving means when the corner boom means is in a selected position.

DESCRIPTION OF THE DRAWINGS

A more thorough understanding of the invention may be obtained by a study of the following detailed description taken in connection with the accompanying drawings in which.

DESCRIPTION OF THE PREFERRED EMBODIMENT

Figure 1A:
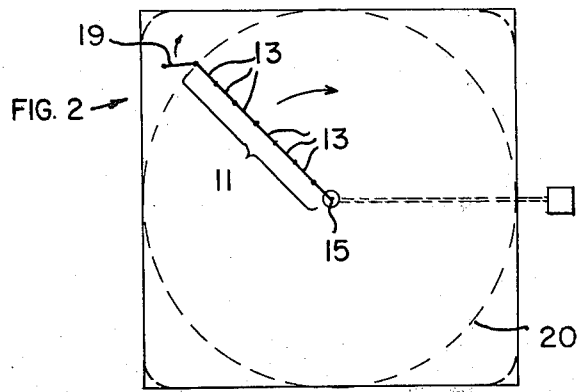
FIG. 1a is a simplified pictorial diagram showing a center pivot irrigation system with a controlled corner boom.
Figure 2:
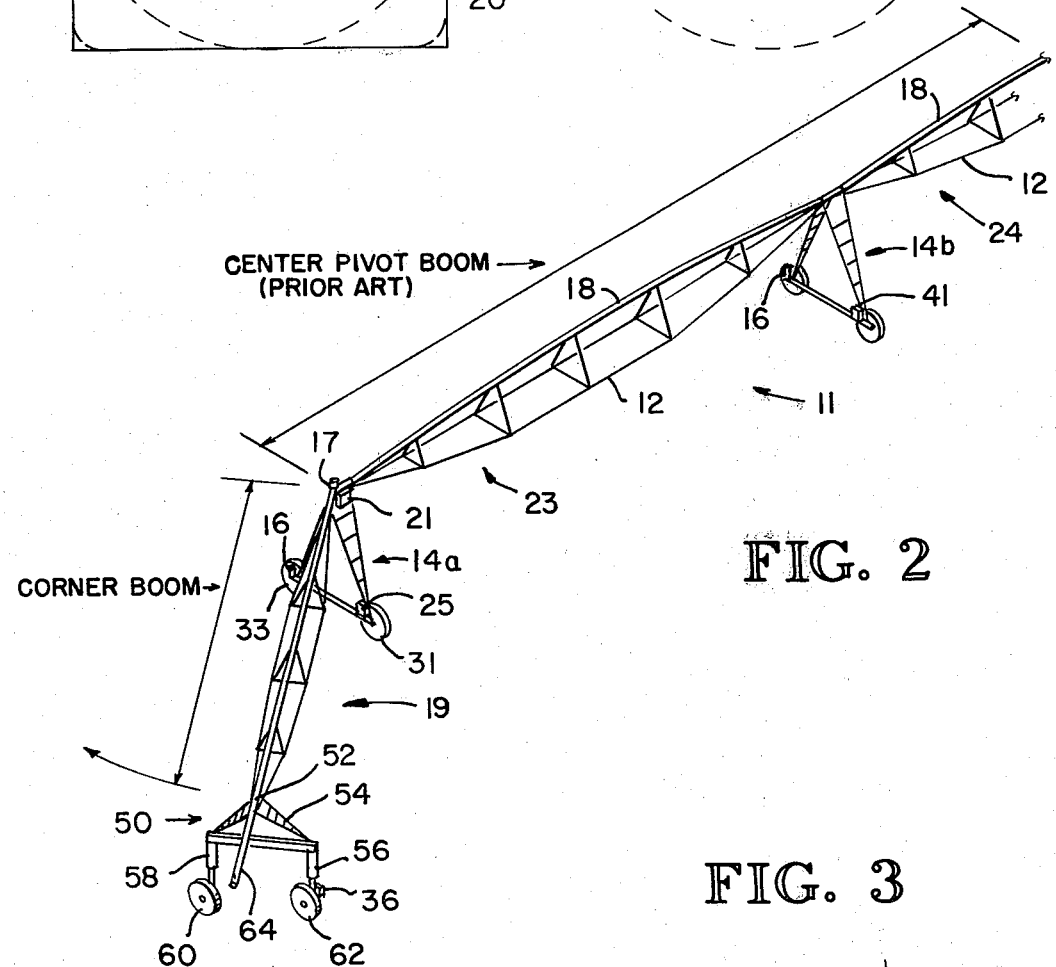
FIG. 2 is a diagram showing the combination of a portion of a center pivot boom and a corner boom, and the position of the system encoders on the booms.

Referring to FIGS. 1a and 2, a center pivot irrigation system of the kind known in the art generally comprises an elongated center pivot or primary boom 11, which is centered on center pivot point 15 and which comprises a plurality of individual sections 13—13 which are joined successively in a pivoting arrangement so that adjacent sections are capable of pivoting through a range of angles relative to each other. Typically, the individual sections are 120 foot lengths of aluminum irrigation pipe 6 inches in diameter.

The center pivot boom 11 includes a truss framework (shown generally at 12 in FIG. 2) and is supported for movement by a plurality of support towers (shown at 14a, 14b in FIG. 2 for the two sections included there). The support towers include a set of wheels, which are powered by individually controllable motors 16. In the embodiment shown the motors are single speed, so that movement of the center pivot boom is achieved through an on/off control of the motor. The motors also control the direction of movement of the center pivot boom sections through electro-mechanical servo-mechanisms connected to the wheels, which in turn are rotatably connected to their associated support tower.

The center pivot boom also includes a primary water conduit (shown generally at 18 in FIG. 2) to which are attached a plurality of spaced sprinklers (not shown). As each wheeled support tower moves in accordance with electrical commands supplied from a central control unit (not shown), the various sections comprising the center pivot boom move accordingly so that the entire center pivot boom, with its primary water conduit, revolves about central pivot point 15, watering a circular area, as shown diagrammatically in FIG. 1a.

Figure 1B:
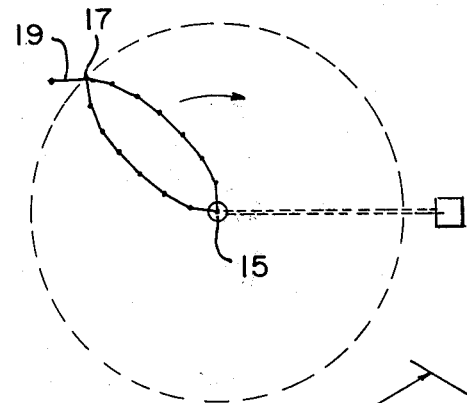
FIG. 1b is a simplified pictorial diagram of a center pivot irrigation system with an end boom, similar to FIG. 1a, except that the center pivot boom is shown in both a leading and lagging curvature.

Typically, one such center pivot system will be used to service a quarter section of land, i.e. 160 acres. However, as mentioned above, approximately 30 acres of a 160 acre quarter section is lost to productive use because of lack of coverage from the circle irrigation system. Thus, referring to FIG. 1a, the water and fertilizer, if included, will only cover the area of the circle 20. Although FIG. 1a shows the center pivot boom 11 lying in a straight line, it actually is quite irregular in configuration, and furthermore, the irregularity continuously changes, as the center pivot boom moves. Due to the extreme length of the center pivot boom and the fact that it comprises multiple sections, with each section being independently controllable, this unpredictable irregularity is present at all times that the system is operating. FIG. 1b illustrates two particular configurations, showing the center pivot boom 11 leading the end point 17 of the center pivot boom 11, and when it is lagging the end point 17. It would be rare, however, that the center pivot boom would exhibit the regular curvature shown in FIG. 1b. Rather, the configuration would be typically irregular, jagged in appearance.

In the system of the present invention, an extension is added to the center pivot boom, shown in FIG. 2, referred to in general as a corner boom 19. Corner boom 19 extends outward from end point 17 of center pivot boom 11. Corner boom 19 is constructed generally similarly to center pivot boom 11, and includes a secondary water conduit which is connected to the primary water conduit of center pivot boom 11 and a supporting truss arrangement. Corner boom 19 is connected to end point 17 in such a manner that the corner boom is free to pivot through a substantial angle, i.e. in the embodiment shown at least 90°, about end point 17.

Supporting corner boom 19 is a wheeled support tower 50. Support tower 50 is constructed slightly differently than the other support towers, as it includes an upper triangular section 54 which connects to the corner boom at its apex and two depending legs 56 and 58 which extend downwardly from the free corners of triangular section 54. The triangular section 54 and depending legs 56 and 58 are fixed to the corner boom at a 90° angle. At the lower end of legs 56 and 58 are two wheels 60 and 62, which are rotatably secured to their associated legs. Corner boom 19 is steered by rotating wheels 60 and 62 through motors (not shown) which are positioned next to the wheels. The motors are controlled by commands from the same control box which controls the motors on the support towers for the sections comprising the center pivot boom 11.

If desired, an extension 64 may be connected to the end 52 of corner boom 19. This extension may be on the order of 50–100 ft. long and have a sprinkler gun on its end to provide even further coverage for the corner system.

Corner boom 19 provides the structure which is capable of covering most of the remaining portion of the 160 acre section, but for economy of operation, its movement must be properly coordinated with the movement of the center pivot boom 11. As shown in FIG. 1a, for instance, corner boom 19 will be moved in the direction shown by the arrow at the proper times relative to the position of center pivot boom 11, in order to provide the kind of corner coverage shown by the dotted lines. Hence, in the present invention, the combination of a center pivot irrigation system and a properly timed and controlled corner boom results in coverage of substantially the complete quarter section, increasing the production of the section without increasing the amount of land.

In order to properly control and coordinate the movement of the corner boom, the position of the corner boom 19, and particularly the end of the corner boom, relative to the center pivot boom must be known. This has proven to be very difficult to do, because of the irregular configuration of the center pivot boom, and to the best of applicants' knowledge has not heretofore been successfully accomplished. Hence, systems using a corner boom have employed buried conductors and similar complex means.

FIG. 2 shows a portion of the structure of the present invention to determine the location of corner boom 19. A first encoder 21 is positioned at the very end 17 of the end section 23 of the center pivot boom 11, and provides a readout which is actually representative of the angular separation between end section 23 of the center pivot boom 11, and corner boom 19.

An absolute shaft encoder is a known, conventional device, comprising a set of concentric rings on a plane surface, each successive ring having a first portion or portions which can be differentiated electrically from the remainder of the ring. The first portions, when read, result in a "one" output, the remaining portions result in a "zero" output. The portions are of equal length, and alternate between the one and zero characteristic. The number of portions having the one and zero characteristic increase, by a factor of 2, between each ring. A reading of each ring, along a certain radius line, will thus in total provide an indication of the angle of the reference line.

The angle of the corner boom relative to the center pivot boom will determine the location of the reading arm portion of the encoder, which reads the state of each successive ring along its radius line, from the centerpoint of the apparatus to the outside ring. Each concentric circle adds a bit to the final output, so that a ten bit binary output is provided from a ten ring encoder. Such an encoder may be purchased commercially under the term absolute shaft encoder.

Although an absolute shaft encoder is used in the embodiment shown, another device known as an incremental shaft encoder could be used. An incremental shaft encoder is another known, conventional device which generates a series of pulses as the element on which it is positioned is rotated relative to a reference position. At each successive increment of rotation, the incremental shaft encoder generates a known number of pulses. In a particular device, an incremental encoder may be set up to generate ten thousand pulses per revolution, or approximately 27 pulses per degree of revolution.

The encoder 21 at the end point 17 of end section 23 of center pivot boom 11 determines the angular separation between end section 23 and corner boom 19. This is shown as angle $\beta$ in FIG. 3.

A second encoder 25 is positioned on one of the wheels 31, 33 of the support tower 14a which supports end section 23, or on a third wheel (not shown) which extends down from the axle which connects wheels 31, 33. The towers 14a, 14b in FIG. 2 which support end section 23 and first adjacent section 24 are conventional center pivot towers and include a drive shaft connecting the two wheels 31, 33 which in the embodiment shown turns 40 times for each revolution of the wheel. The motor on the support tower drives the driveshaft which in turn drives the wheels 31, 33. The wheels are also rotatable relative to the rest of the support tower for steering purposes, while the rest of the support tower is fixed to the center pivot boom structure.

Encoder 25 in the embodiment shown is an incremental shaft encoder, although it could be an absolute shaft encoder, like encoder 21. The pulses generated by encoder 25, beginning when the end section 23 is at a reference point, represents the angle $\alpha$ in FIG. 3, which is the angle between reference line 37 and a straight line 46 which connects center pivot point 15 and end 17 of the center pivot boom. It should be understood, however, that although the pulses are representative of angular change, they also individually represent a substantially straight-line movement of the particular point on the boom where the encoder is located, i.e. point 17 for encoder 25 in the embodiment shown.

A third encoder 41 is positioned next to one wheel of the support tower 14b which is associated with the first adjacent section 24 of the center pivot boom. The third encoder 41, like encoder 25, may be positioned either right next to a wheel of the support tower, or on a third wheel (not shown) on the driveshaft which connects the two wheels shown. In the embodiment shown, encoder 41 is an incremental shaft encoder, which produces a series of pulses, which in total are representative of the angle $\alpha'$ in FIG. 3, or the angle between reference line 37 and a straight line 47 which connects the pivot point 15 and the pivot connection 48 which links end section 23 and first adjacent section 24. Like the pulse output from encoder 25, each pulse from encoder 41 is representative of a known straight line distance traveled by pivot connection 48. A fourth encoder 36 is positioned adjacent one of the wheels on support tower 50 to determine the steering angle $\Psi$ of the wheels of corner boom 19, which information is used by the control unit to determine proper directional commands. Also, a slot encoder (not shown) may be included to measure the extent of travel of the end of the corner boom relative to end point 17.

The incremental pulse information from encoders 25 and 41, which is representative of the distance traveled by points 17 and 48 of the center pivot boom, respectively, us used to determine the angle $\Delta\beta$, which is the angle between the end section 23 and the imaginary straight line 46 connecting end point 17 and center pivot point 15. Once the angle $\Delta\beta$ is known, then the end point of corner boom 19 can be precisely calculated, as described below, so that the commands controlling movement of the boom 19 can be provided to the support tower 50 for boom 19 at the proper time in relation to the position of center pivot boom 11.

Figure 3:
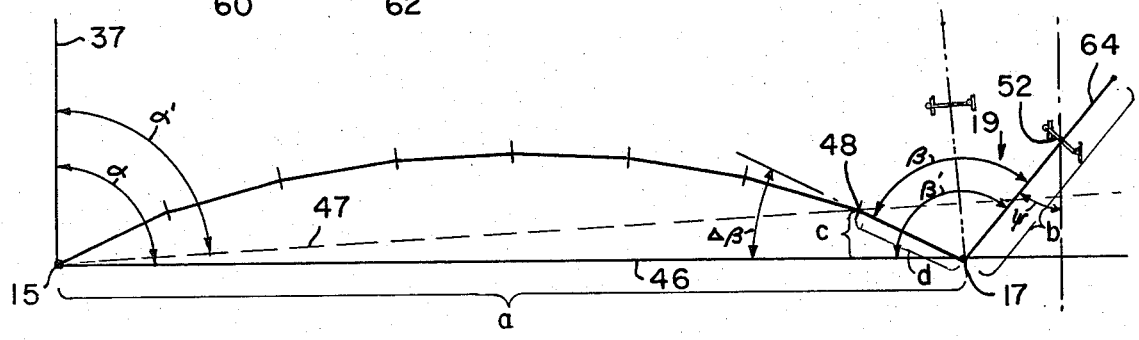
FIG. 3 is a simplified diagram showing the combination of a center pivot boom and a corner boom, and the various measured angles which are used to calculate the position of the corner boom.

If point 48 lies on line 46 connecting pivot point 15 and end point 17 during movement of the center pivot boom 11, then $\Delta\beta$ equals zero, and $\beta$ is the angle between line 46 and corner boom 19. Since the length of line 46 is known or easily determined, then the location of boom 19, including its end point 52, may be accurately determined. In such a situation, the pulse output from encoder 41, at point 48 will be equal to the pulse output from encoder 25, at point 17. However, if point 48, and hence encoder 41, does not lie on line 46 during movement of the boom 11, which is typically the situation, i.e. when point 48 leads or lags point 17, as shown in FIG. 3, the number of pulses from encoders 25 and 41 will be different. The difference between the actual number of pulses from encoder 41 and the number which would equal that from encoder 25 can then be multipled by the incremental distance each pulse represents to obtain the distance by which point 48 leads or lags point 17. This is the straight line distance between point 48 and line 46, and is labeled c in FIG. 3.

Once the distance c is thus obtained, the angle $\Delta\beta$ may be easily calculated, from known trigonometric principles, since the distance d is also known. The value of the angle $\Delta\beta$, once known, can be added to the measured angle $\beta$ to provide the desired angle $\beta'$, which is the angle between line 46 and the corner boom 19. Since the length of corner boom 19 is also known, the precise location of the end point of corner boom 19 can be located.

Figure 4:
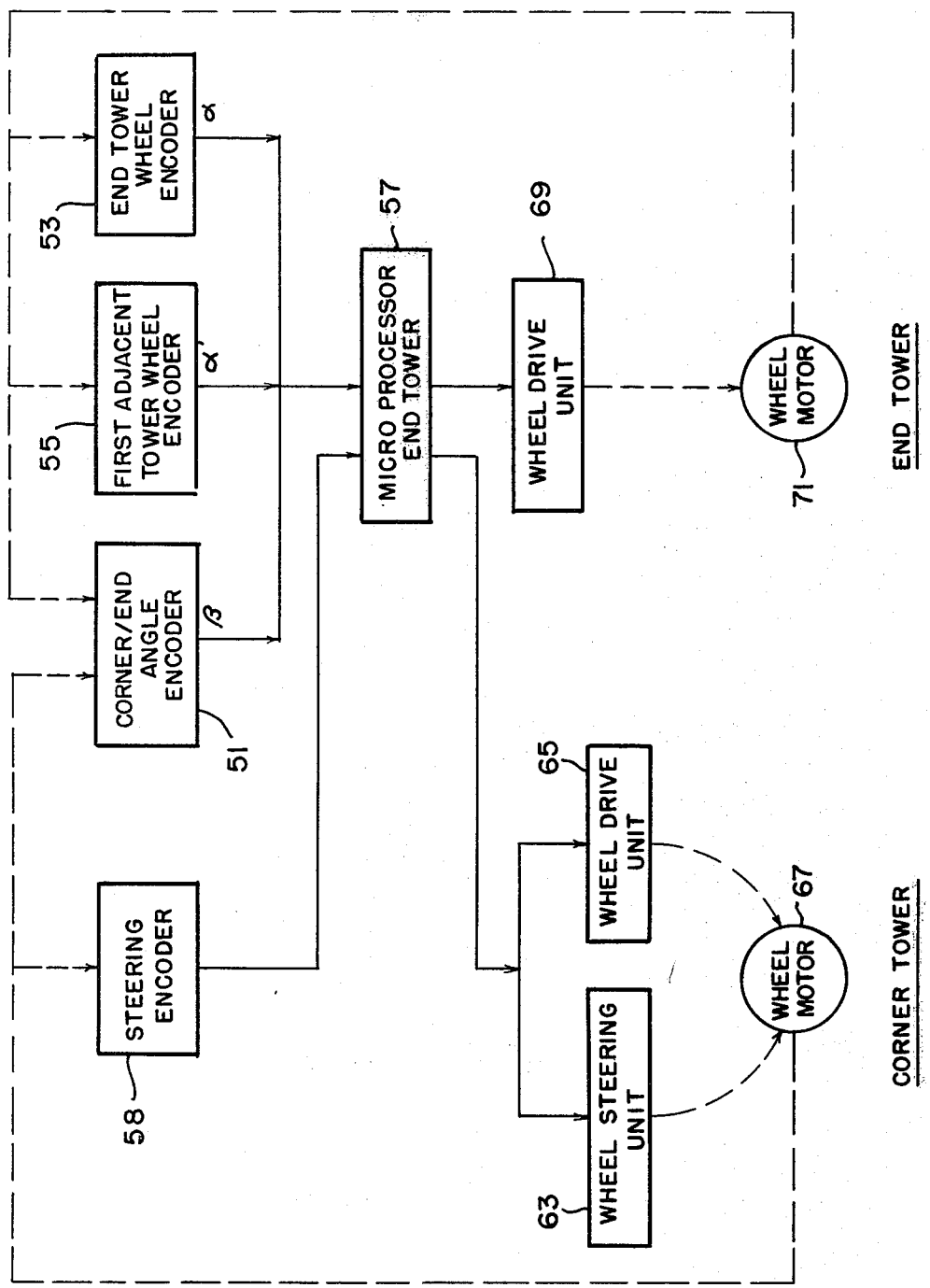
FIG. 4 is a block diagram showing the portion of the present invention which uses the information generated by the encoders shown in FIG. 2 to produce the commands necessary for proper movement of the corner boom and center pivot boom.

FIG. 4 is a block diagram showing the flow of data and command information to and from the elements of the system described above. The block 51 in FIG. 4 represents the first encoder 21 of FIG. 2, positioned at the end point 17 of the center pivot boom 11, measuring the angle $\beta$ between the end section 23 of the center pivot boom 11, and corner boom 19. The blocks labeled 53 and 55 in FIG. 4 correspond to the encoders 25 and 41 shown in FIG. 2. As explained above, with respect to the operation of the encoders, the signals from blocks 53 and 55 are pulses which are individually representative of a small straight-line distance traveled by certain points on the center pivot boom, and from which desired distances and angles may be ascertained. The pulse data from encoder blocks 51, 53 and 55 is applied to a microprocessor 57. Encoder data from block 58, which corresponds to encoder 36, which measures the steering angle of the wheels on support tower 50, may also be applied to the microprocessor 57.

The microprocessor includes an arithmetic unit which performs the arithmetic and trigonometric calculations described above to precisely locate the end of corner boom 19. The microprocessor also continuously compares the information from the encoders with information concerning the proper timing for initiation and termination of corner boom movement. In operation, when the corner boom reaches its correct position within the area being watered, commands are generated by the microprocessor 57 and applied to a wheel steering unit 63 and a wheel drive unit 65 on the support tower for the corner boom.

The wheel steering unit 63 is a conventional device which, in response to an electrical command, rotates the wheel of the support tower through a motor 67, so that the support tower moves in the proper direction. In the embodiment shown, the motor runs at a fixed speed, but a variable speed motor could also be used, and would increase the capability of the unit. The wheel drive unit 65 is also conventional and controls the one-off condition of the motor. In operation, the corner boom 19 moves, under the power of the motor in the support tower, until it reaches a desired stop point and the power to the wheels is then terminated.

Commands from the microprocessor are also applied to a wheel drive unit 69 which in turn controls the on-off condition of the motor 71 running the wheels on support tower 14a. The microprocessor 57 will also typically, but not necessarily, contain a program which sequences the timing of the commands to the wheel drive units on each section comprising the center pivot boom, as well as the wheel drive unit for the support tower of the corner boom. Such a program, per se, is not a part of the present invention, and in fact such a program is not required for proper operation of applicant's corner boom invention. Typically, however, a program is designed to provide signals for control of the movement of the individual sections, for maximum irrigation coverage of a given section of land at maximum efficiency.

If the land section is a square, in which the unwatered space in the corners are to be covered, the program would provide the proper control signals for both the center pivot boom and the corner boom. The control signals for the corner boom results in the corner boom swinging away from its trailing position (as shown in FIGS. 1 and 2) through a particular arc and then retreating to a trailing rest position all at the proper time. Usually, the rest position for the corner boom is a trailing position.

In a more complicated application, there may be fixed objects in the path of the corner irrigation which are to be avoided. With the present invention, sufficient control is available to irrigate an irregular pattern. It is difficult with previous systems to design a system which is capable of following an irregular pattern without a significant sacrifice in coverage.

Hence, a system has been described which generates the necessary information by which the location of the corner boom can be continuously and accurately determined, so that control commands can be supplied to corner boom motors at precisely the right time. The system results in the irrigation of corner portions as well as irregular patterns. The system requires no external equipment, such as a buried conductor, and is relatively inexpensive and simple to operate.

It should be emphasized, however, that although the preferred embodiment describes a particular kind of device to provide the required information, i.e. an encoder, other devices could be so used. The invention is thus not limited to a particular embodiment using encoders.

It should be understood that other changes, modifications and substitutions may be incorporated in the preferred embodiment without departing from the spirit of the invention as defined by the claims which follow.

What is claimed is:

1. An irrigation system apparatus, comprising:

a center pivot boom means which includes a primary water conduit and which in operation moves about a center pivot point, the center pivot boom means being divided into a plurality of sections which pivot relative to each other;

means for supporting said center pivot boom means;

corner boom means which has at least one section and which includes a secondary water conduit, said corner boom means joined to the outermost end of said center pivot boom means in a pivoting relationship thereto;

means for supporting said corner boom means;

means for moving said center pivot boom means supporting means and hence said center pivot boom means about said center pivot point;

means for moving said corner boom means supporting means and hence said corner boom means about the outermost end of said center pivot boom means in response to signal commands;

first means for determining the angle between (a) an imaginary reference line, which is a straight line connecting the center pivot point and the outermost end of the center pivot boom means, and (b) a fixed reference line having a known position relative to the irrigation area over which the center pivot boom means moves;

second means for determining the angle of said corner boom means relative to the imaginary reference line;

means using the information from said first and second angle determining means to determine the position of said corner boom means relative to the irrigation area; and means supplying signal commands to said means for moving said corner boom means supporting means when said corner boom means is in a selected position relative to the irrigation area.

2. An apparatus which is useful with an irrigation system having a center pivot boom which includes a primary water conduit and which in operation moves about a center pivot point, the center pivot boom being divided into a plurality of sections which pivot relative to each other, the apparatus comprising:

corner boom means, which includes a secondary water conduit, joined to the outermost end of said center pivot boom in a pivoting relationship thereto;

means supporting said corner boom means;

means for moving said supporting means and hence said corner boom means about the outermost end of said center pivot boom in response to a signal command;

first means for determining the angle between (a) an imaginary reference line, which is a straight line connecting the center pivot point and the outermost end of the center pivot boom, and (b) a fixed reference line having a known position relative to the irrigation area over which the center pivot boom moves;

second means for determining the angle of said corner boom means relative to the imaginary reference line;

means using the information from said first and second angle determining means to determine the position of said corner boom means relative to the irrigation area; and means supplying signal commands to said moving means when said corner boom means is in a selected position relative to the irrigation area.

3. An apparatus of claim 2 or 1, wherein said second angle determining means includes means for determining the angle between the end section of said center pivot boom and the corner boom means, and means for determining the straight line distance between (1) the pivot point joining the end section and the first adjacent section of the second pivot boom and (2) the imaginary reference line.

4. An apparatus of claim 3, wherein said straight line distance determining means includes a first signal generating means producing a signal representative of the angle between the fixed reference line and the outermost end of the center pivot boom, and a second signal generating means producing a signal representative of the angle between the fixed reference line and the pivot point joining the end section and the first adjacent section of the center pivot boom, the signals produced by said first and second signal generating means also being representative, on an incremental basis, of the distance traveled by the outermost end and the pivot point joining the end section and the first adjacent section, respectively, of the center pivot boom.

5. An apparatus of claim 4, wherein said means for determining the angle between the corner boom means and the end section of said center pivot boom is a first shaft encoder, and wherein said first and second signal generating means, respectively, are second and third shaft encoders.

6. An apparatus of claim 5, wherein said first encoder is positioned on the outermost end of the center pivot boom, wherein said second encoder is positioned on a first supporting means for the center pivot boom located in the vicinity of the outermost end of the center pivot boom, and wherein said third encoder is positioned on a second supporting means for the center pivot boom located in the vicinity of the pivot point between the first adjacent section and the end section of the center pivot boom.

7. An apparatus of claim 6, including a fourth encoder positioned on said supporting means for the corner boom means, to determine the angle of the wheels of said supporting means relative to the corner boom means, and further including means routing the wheel angle data so determined to said corner boom position determining means.

8. An apparatus of claim 1 or 2, wherein said corner boom means, when not actuated, trails the center pivot boom, approximately in the path of the outermost end of the center pivot boom, and when actuated, swings out about the outermost end of the center pivot boom over a specified angle, when the corner boom means is in a selected position relative to the irrigation area.

9. An apparatus of claim 8, wherein the specified angle is approximately 90°.

10. An apparatus of claim 8, wherein the wheels of the supporting means for said corner boom means are rotatably connected thereto, and wherein said moving means includes means for controlling the direction and movement of said wheels in response to signal commands.

11. An apparatus which is useful with an irrigation system having a center pivot boom means which includes a primary water conduit and which in operation moves about a center pivot point, the center pivot boom means being divided into a plurality of sections which pivot relative to each other, the apparatus comprising:

corner boom means, which includes a secondary water conduit, joined to the outermost end of said center pivot boom means in a pivoting relationship thereto;

means supporting said corner boom means;

means for moving said supporting means and hence said corner boom means about the outermost end of said center pivot boom means in response to a signal command;

first means for determining the angle between said center pivot boom means and a fixed reference line having a known position relative to the irrigation area over which the center pivot boom means moves;

second means for determining the angle between said corner boom means and the center pivot boom means;

means using the information from said first and second angle determining means to determine the position of said corner boom means relative to the irrigation area; and means supplying signal commands to said moving means when said corner boom means is in a selected position relative to the irrigation area.

12. An irrigation system apparatus, comprising:

a center pivot boom means which includes a primary water conduit and which in operation moves about a center pivot point, the center pivot boom means being divided into a plurality of sections which pivot relative to each other;

means for supporting said center pivot boom means;

corner boom means which has at least one section and which includes a secondary water conduit, said corner boom means joined to the outermost end of said center pivot boom means in a pivoting relationship thereto;

means for supporting said corner boom means;

means for moving said center pivot boom means supporting means and hence said center pivot boom means about said center pivot point;

means for moving said corner boom means supporting means and hence said corner boom means about the outermost end of said center pivot boom means in response to signal commands;

first means for determining the angle between said center pivot boom means and a fixed reference line having a known position relative to the irrigation area over which the center pivot boom means moves;

second means for determining the angle between said corner boom means and said center pivot boom means;

means using the information from said first and second angle determining means to determine the position of said corner boom means relative to the irrigation area; and means supplying signal commands to said means for moving said corner boom means supporting means when said corner boom means is in a selected position relative to the irrigation area.

13. An apparatus of claim 11 or 12, wherein said first angle determining means is an encoder positioned on a supporting means for the center pivot boom means located in the vicinity of the outermost end of the center pivot boom means, and wherein said second angle determining means is an encoder positioned on the outermost end of the center pivot boom means.

14. An apparatus of claim 13, wherein said corner boom means, when not actuated, trails the center pivot boom means, approximately in the path of the outermost end of the center pivot boom means, and when actuated, swings about the outermost end of the center pivot boom means over a specified angle, when the corner boom means is in a selected position relative to the irrigation area.

15. An apparatus of claim 14, wherein the specified angle is approximately 90°.

16. An apparatus of claim 11 or 12, wherein said supporting means for said corner boom means includes wheels which contact the ground over which said corner boom means moves, said wheels being rotatably connected to said corner boom supporting means, the apparatus including means for determining the angle of said wheels relative to said corner boom means and means for routing the wheel angle information to said corner boom position determining means, the apparatus further including means for controlling the direction and movement of said wheels in response to signal commands.

17. An apparatus which is useful with an irrigation system having a center pivot boom which includes a primary water conduit and which in operation moves about a center pivot point, the center pivot boom being divided into a plurality of sections which pivot relative to each other, the apparatus comprising:

corner boom means, which includes a secondary water conduit, joined to the outermost end of said center pivot boom in a pivoting relationship thereto;

means supporting said corner boom means;

means for moving said supporting means and hence said corner boom means about the outermost end of said center pivot boom in response to a signal command;

first means for measuring the angle of said corner boom means relative to an imaginary reference line connecting the center pivot point and the outermost end of the center pivot boom;

second means for measuring the angle between the imaginary reference line connecting the center pivot point and the outermost end of the center pivot boom and a fixed reference line having a known position relative to the irrigation area over which the center pivot boom moves;

means using the information from said first and second angle measuring means to determine the position of said corner boom means relative to the irrigation area;

means supplying signal commands to said moving means when said corner boom means is in a selected position relative to the irrigation area.

18. An apparatus of claim 17, wherein said second angle measuring means includes means for measuring the angle between the end section of said center pivot boom and the corner boom means, and means for measuring the straight-line distance between (1) the pivot point joining the end section and the first adjacent section of the center pivot boom and (2) the imaginary reference line.

19. An apparatus of claim 18, wherein said straight line distance measuring means incudes a first signal generating means producing a signal representative of the angle between the fixed reference line and the outermost end of the center pivot boom, and a second signal generating means producing a signal representative of the angle between the fixed reference line and the pivot point joining the end section and the first adjacent section of the center pivot boom, the signals produced by said first and second signal generating means also being representative, on an incremental basis, of the distance traveled by the outermost end and the pivot point joining the end section and the first adjacent section, respectively, of the center pivot boom.

20. An apparatus of claim 19, wherein said means for measuring the angle between the corner boom means and the end section of said center pivot boom is a first shaft encoder, and wherein said first and second signal generating means, respectively, are second and third shaft encoders.

21. An apparatus which is useful with an irrigation system having a center pivot boom which includes a primary water conduit and which in operation moves about a center pivot point, the center pivot boom being divided into a plurality of sections which pivot relative to each other, the apparatus comprising:

corner boom means, which includes a secondary water conduit, joined to the outermost end of said center pivot boom in a pivoting relationship thereto;

means supporting said corner boom means;

means for moving said supporting means and hence said corner boom means about the outermost end of said center pivot boom in response to a signal command;

first means for measuring the angle of said corner boom means relative to the end section of the center pivot boom;

second means for measuring the angle between the center pivot boom and a fixed reference line having a known position relative to the irrigation area over which the center pivot boom moves;

means using the information from said first and second angle measuring means to determine the position of said corner boom means relative to the irrigation area; and means supplying signal commands to said moving means when said corner boom means is in a selected position relative to the irrigation area.

22. An apparatus which is useful with an irrigation system having a center pivot boom which includes a primary water conduit and which in operation moves about a center pivot point, the center pivot boom being divided into a plurality of sections which pivot relative to each other, the apparatus comprising:

corner boom means, which includes a secondary water conduit, joined to the outermost end of said center pivot boom in a pivoting relationship thereto;

means supporting said corner boom means;

means for moving said supporting means and hence said corner boom means about the outermost end of said center pivot boom in response to a signal command;

first means for measuring the angle of said corner boom means relative to the end section of the center pivot boom;

second means for measuring the angle between (a) an imaginary reference line connecting the center pivot point and the outermost end of the center pivot boom, and (b) a fixed reference line having a known position relative to the irrigation area over which the center pivot boom moves;

means using the information from said first and second angle measuring means to determine the position of said corner boom means relative to the irrigation area; and means supplying signal commands to said moving means when said corner boom means is in a selected position relative to the irrigation area.

23. An apparatus which is useful with an irrigation system having a center pivot boom which includes a primary water conduit and which in operation moves about a center pivot point, the center pivot boom being divided into a plurality of sections which pivot relative to each other, the apparatus comprising:

corner boom means, which includes a secondary water conduit, joined to the outermost end of said center pivot boom in a pivoting relationship thereto;

means for moving said supporting means and hence said corner boom means about the outermost end of said center pivot boom in response to a signal command;

means for measuring the distance traveled by the outermost end of the center pivot boom from a fixed reference line having a known position relative to the irrigation area over which the center pivot boom moves;

means for measuring the angle of said corner boom means relative to the end section of the center pivot boom;

means using the information from said distance measuring means and said angle measuring means to determine the position of said corner boom means relative to the irrigation area; and means supplying signal commands to said moving means when said corner boom means is in a selected position relative to the irrigation area.

24. The apparatus of claim 23, including means for measuring the distance traveled by a pivot point joining the end section and the first adjacent section of the center pivot boom in order to determine the angle between the end section and an imaginary reference line connecting the center pivot point and the outermost end of the center pivot boom.

25. An apparatus which is useful with an irrigation system having a center pivot boom which includes a primary water conduit and which in operation moves about a center pivot point, the center pivot boom being divided into a plurality of sections which pivot relative to each other, the apparatus comprising:

corner boom means, which includes a secondary water conduit, joined to the outermost end of said center pivot boom in a pivoting relationship thereto;

means supporting said corner boom means;

means for moving sid supporting means and hence said corner boom means about the outermost end of said center pivot boom in response to a signal command;

means for determining the position of the outermost end of the center pivot boom relative to the irrigation area over which the center pivot boom moves;

means for determining the angle of said corner boom means relative to one of (a) an imaginary reference line, which is a straight line connecting the center pivot point and the outermost end of the center pivot boom, or (b) the center pivot boom;

means using the information from said position determining means and said angle determining means to determine the position of said corner boom means relative to the irrigation area; and means supplying signal commands to said moving means when said corner boom means is in a selected position relative to the irrigation area.

26. An apparatus in accordance with claim 25, wherein said position determining means includes means for measuring the angle between the imaginary reference line and a fixed reference line having a known position relative to the irrigation area over which the center pivot boom moves.

* * * * *